US006387267B1

(12) United States Patent
Kantardjieff

(10) Patent No.: US 6,387,267 B1
(45) Date of Patent: May 14, 2002

(54) LIQUID WASTE TREATMENT BIOREACTOR PROCESS AND APPARATUS

(76) Inventor: Alexandra Kantardjieff, 663 Vauquelin Street, Rock Forest, Quebec (CA), J1N 1X7

( * ) Notice: Subject to any disclaimer, the term of this patent is extended or adjusted under 35 U.S.C. 154(b) by 0 days.

(21) Appl. No.: 09/214,364

(22) PCT Filed: May 4, 1997

(86) PCT No.: PCT/CA98/00462

§ 371 Date: Jan. 4, 1999

§ 102(e) Date: Jan. 4, 1999

(87) PCT Pub. No.: WO98/50311

PCT Pub. Date: Nov. 12, 1998

(30) Foreign Application Priority Data

May 2, 1997 (CA) .............................................. 2204422

(51) Int. Cl.[7] .................................................. C02F 3/06
(52) U.S. Cl. ........................ 210/615; 210/620; 210/622; 210/768
(58) Field of Search ................................. 210/205, 150, 210/151, 195.1, 221.1, 221.2, 620, 903, 610, 615, 622, 631, 768, 787; 71/64.07

(56) References Cited

U.S. PATENT DOCUMENTS

| 3,875,319 | A | * | 4/1975 | Seckler et al. | 210/787 |
| 4,122,011 | A | | 10/1978 | Strigle, Jr. | 210/150 |
| 4,623,529 | A | * | 11/1986 | Sanders et al. | 423/328 |
| 4,772,307 | A | * | 9/1988 | Kiss et al. | 210/616 |
| 4,800,021 | A | | 1/1989 | Desbos | 210/605 |
| 5,019,268 | A | | 5/1991 | Rogalla | 210/617 |
| 5,211,847 | A | | 5/1993 | Kanow | 210/610 |
| 5,718,823 | A | * | 2/1998 | Tomita et al. | 210/150 |
| 5,772,870 | A | * | 6/1998 | Basse | 210/150 |

FOREIGN PATENT DOCUMENTS

| JP | 62294496 A | 12/1987 |
| WO | WO 95/06010 | 3/1995 |

* cited by examiner

Primary Examiner—Duane Smith
Assistant Examiner—Frank M. Lawrence
(74) Attorney, Agent, or Firm—Womble Carlyle Sandridge & Rice, PLLC

(57) ABSTRACT

The present invention relates to a precess and apparatus for biological treatment of liquid and solid waste. The liquid waste is treated by an upflow aerobic biofilter and the solid waste is treated with powdered zeolite.

6 Claims, 7 Drawing Sheets

LIQUID WASTE TREATMENT BIOREACTOR PROCESS AND APPARATUS

BACKGROUND OF THE INVENTION

This invention relates to a process and apparatus for biological treatment of waste liquid. In a preferred aspect, the invention relates to a process and apparatus for biological treatment of the liquid fraction of separated pig manure by an upflow aerobic blofilter and to the coating of the solid fraction by powder zeolite. The process and apparatus according to the invention may also be used for treating waste industrial water.

The most widely used way today to manage pig manure is through storage in lagoons or concrete reservoirs and land spreading in the Spring and the Fall. For pig farms with sufficient cultivated land nearby, this way of managing the manure is appropriate, as long as the soil is not too permeable and does not allow pollutants in the manure to percolate through the soil and contaminate the subsurface waters.

Land spreading of the solid pig manure, containing high concentrations of ammonia results in leaching of ammonia and other contaminants when it rains. In order to allow land spreading of solid pig manure, some means of fixation of the nitrogenous compounds is required.

In areas of concentration of pig farms, an excess of manure versus available land for apreading exists and conventional methods of managing are inadequate. In such surplus areas, different aerobic or anaerobic systems for biological treatment of the pig manure have been installed in the past, but these installations do not always function property.

The main problems associated with aerobic processes, such as aerated lagoons, activated sludge or sequential batch reactors, lie in the inefficiency of the existing aeration systems, and in the fact that both the solid and liquid components of pig manure are treated together biologically. Aerobic biofilter systems may be prone to clogging, particularly when activated charcoal or clay-based media are used. Anaerobic systems require insulation and heating of the reactors In order to allow adequate completion of the biochemical reactions, particularly during colder weather.

In addition, any of these systems require very skilled manpower to operate, which is rarely adequately available in remote agricultural areas.

The result is often a failure of the conventional biological treatment processes.

The liquid fraction of farm and industrial waste can often be used rather than merely disposed of. For example, pig manure can be used for pig farm floor cleaning and other uses, as long as sufficient biological degradation of the organic and inorganic pollutants therein has occurred. The aerobic upflow biofilter described herein is an appropriate way to achieve this degradation.

SUMMARY OF THE INVENTION

One feature of the present invention is to provide a process and an apparatus for treating farm and industrial waste which are very efficacious and which do not require skilled manpower to operate.

Another feature of the present invention is to provide a process for treating the liquid fraction of such waste with an aerobic upflow biofilter to substantially reduce pollutants therein.

Another feature of the present invention is to provide a process for treating the solid fraction of such waste with zeolite in order to release the ammonia frown the manure.

In accordance with the features of the present invention, the liquid and solid fractions of the farm or industrial waste are first separated and then treated separately. The liquid fraction is treated in an aerobic biofilter system in which a liquid waste fraction and air are passed upflow through a reactor with a perforated media. This media is porous and is designed to reduce clogging by suspended material in the manure, but allow accumulation of biomass within the biofilter and thereby induce high oxygen transfer.

The solid fraction of the pig manure is accumulated and is mixed with powder zeolite. The affinity of ammonia for zeolite encourages the exchange, fixation and slow subsequent release of ammonia from this fraction.

Accordingly, the present invention provides a liquid waste treatment apparatus which comprises:

(a) a container having a top end and a closed bottom end;

(b) a first inlet on the container proximal to the closed bottom end for introducing liquid waste;

(c) a second Inlet on the container proximal to the closed bottom end for introducing oxygen-containing gas;

(d) a first outlet on the container proximal to the top end for removing treated liquid waste;

(e) a second outlet on the container proximal to the closed bottom end for purging solid or semi-solid residue;

(f) a rigid or semi-rigid perforated media occupying at least part of the container between the top end and the bottom end; and (g) means for forcing the liquid waste through the media from the first inlet to the first outlet.

The present invention further provides a process for treating liquid waste in an apparatus as defined above, which process comprises:

(a) introducing liquid waste into the container through the first inlet;

(b) introducing oxygen-containing gas into the container through the second inlet;

(c) forcing the liquid waste through the media whereby the media provides a platform for aerobic microbial degradation of the liquid waste;

(d) recovering treated liquid waste from the first outlet; and (e) intermittently purging solid or semi-solid residue through the second outlet.

BRIEF DESCRIPTION OP THE DRAWINGS

DETAILED DESCRIPTION OF THE PREFERRED EMBODIMENTS

The liquid waste treatment apparatus consists of at least one aerobic upflow biofilter, also known as a bioreactor.

Inlets at or near the bottom permit the introduction of (a) liquid waste and (b) air or some other oxygen-containing gas. An outlet at or near the top permits the removal of treated waste. The area between the inlets and the outlet is substantially occupied with media. Another outlet, preferably at or near the bottom, permits the purging, from time to time, of accumulated residue.

Figure 7:
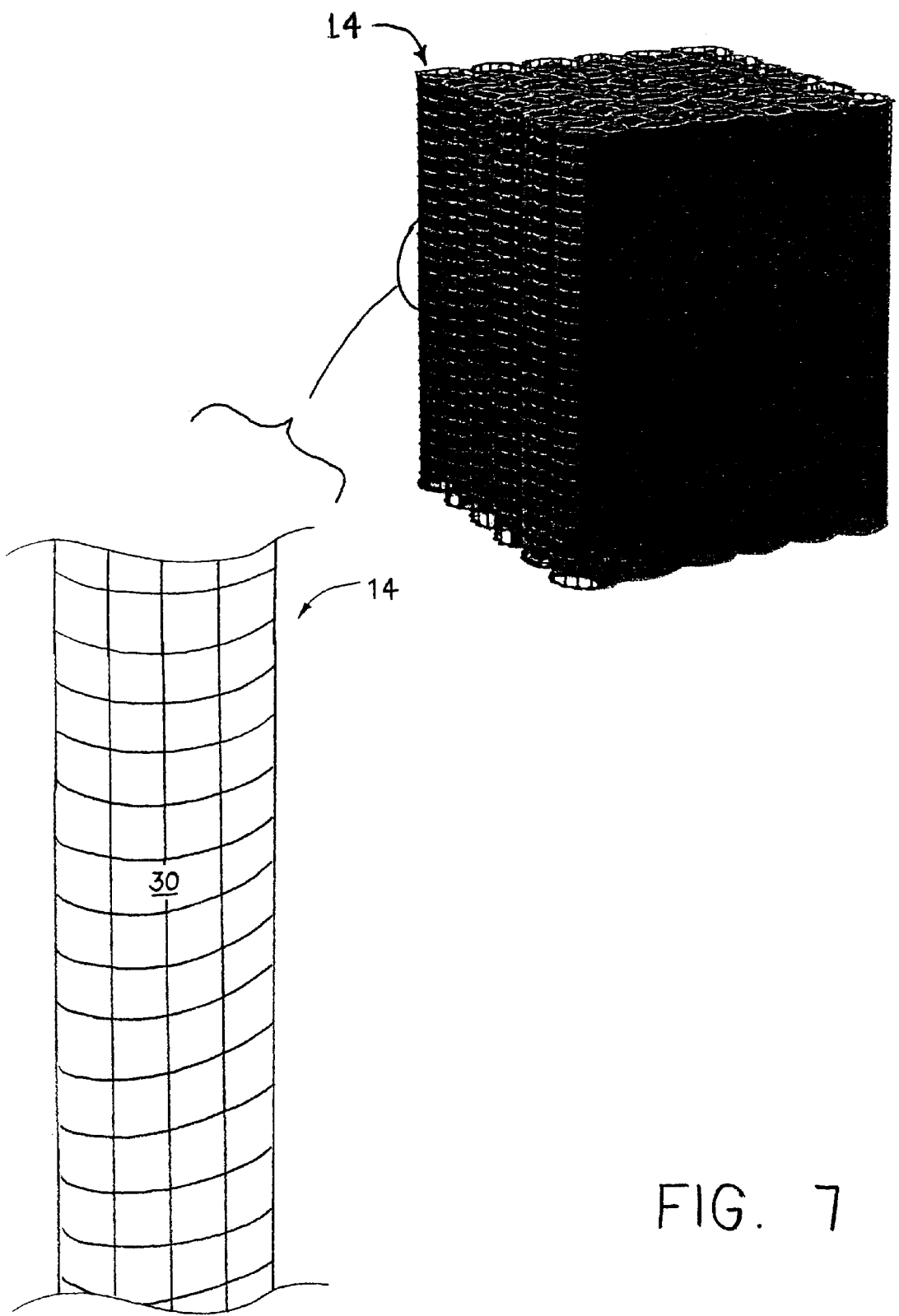
FIG. 7 is a perspective view of the media of the present invention with a partial exploded view of such media.

The media 14 within the biofilter is preferably tubular, with a diameter of, for example, about 7.5 cm and lengths according to the dimensions of the bioreactor. The longitudinal axis of the media is preferably substantially perpendicular to the direction of flow of the waste through the bioreactor. As illustrated in FIG. 7, the media 14 is perforated, preferably having an open net type surface 30, which reduces clogging by suspended material in the liquid waste, but allows accumulation of biomass within the bioreactor and high oxygen transfer. The media is preferably, but not necessarily, plastic.

Liquid waste is introduced into the biofilter along with an oxygen-containing gas and forced through the media, for example by one or a combination of a pump and/or blower and/or tube diffuser. The media allow the microorganisms responsible for treatment of the liquid waste to develop at the media surface forming a biological film. The oxygen-containing gas bubbling upward through the media provides the oxygen necessary for the growth and survival of these microorganisms. Biomass accumulates on the perforated media and microorganisms therein.

The organic substances, as measured by the biological oxygen demand in five days, or $BOD_5$, in the liquid fraction of the waste is decomposed by a diverse microbial population that accumulates on the surfaces and in the pores of the media. In comparison to the conventional technologies which allow BOD loading from 0.3 to 1 kg/m$^3$ media/day, the upflow aerobic biofilter according to the present invention is capable of treating organic loading from 2 to 6 kg $BOD_9$/m$^3$ media/day.

This higher organic loading translates into very compact equipment. This is particularly advantageous, for example where the waste to be treated is pig manure in that the equipment can be installed by the pig farm, allowing complete elimination of a manure storage lagoon.

The aeration requirements for the aerobic biofilter are only a fraction of those for conventional processes, since air or other oxygen-containing gas is injected only for the degradation of the organic material in the manure and not for the purpose of mixing the microorganism biomass.

The injected air bubbles, while travelling upflow through the bed packed with the media according to the invention break into very fine small bubbles in the upper sections of the filter. These small bubbles allow the aerobic biofilter to provide very high oxygen transfer efficiencies, thus solving one of the main problems of the conventional processes, such as activated sludge.

Since an aerobic biofilter does not need a clarifier to separate the treated liquid from the active biomass. The process is completely automated by simple programmable apparatus. The operation of the aerobic biofilter packed with the plastic media as previously described does not require skilled personnel.

The liquid waste can be obtained by allowing farm or industrial waste to settle, then separating the liquid waste from the solid or semi-solid component. The latter fraction can be treated separately with zeolite to obtain a useful product, then granulated and either ambient or forced air dried.

Zeolite has previously been used as an ion exchange media, but not for coating substances with high ammonia content. The ammonia Is fixed by the zeolite in a mixing and coating process and the resulting coated waste is substantially odourless. A preferred zeolite for this purpose is clinoptilolite. The drying of the coated material allows it to be bagged and exported away from the area of production as valuable fertilizer. The process and apparatus will be described with particular reference to their application to the treatment of pig manure.

Figure 1:
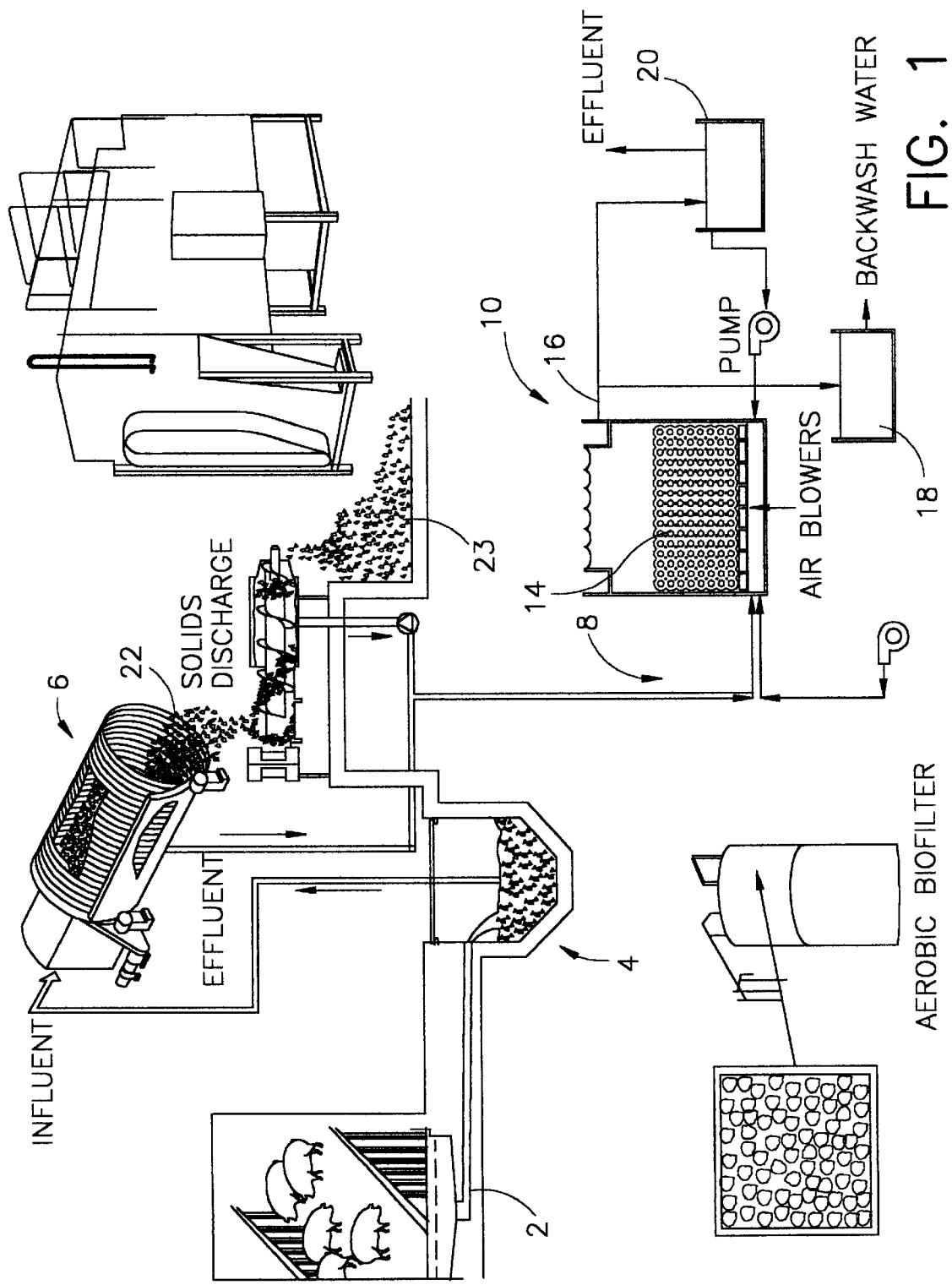
FIG. 1 is a flow diagram of the aerobic biofilter/zeolite coating process according to the invention.

Referring to FIG. 1, the manure (2) from the porchery is into a feed tank (4). From the feed tank (4), the pig manure is fed into a centrifugal seperator known in the art. The liquid portion (8) of the pig manure obainted from the separator (6) is then fed into an aerobic biofilter (10) packed with porous tubular plastic media (14) as described hereinbefore. As illustrated, the liquid fraction (8) is fed into the aerobic biofilter (10) from a lower portion thereof such that the liquid fraction and the air are passed upflow through the biofilter (10). The treated liquid (16) leaves the biofilter from the upper part of the biofilter (10) and it is then fed either in a mud well (18) or in a clear well (20).

The solid fraction of the pig manure (22) obtained from the separator (6) is accumulated in an appropriate place (23) and once a week is mixed with a powder zeollte, granulated and either ambient or forced air dried for allowing exchange, fixation and slow subsequent release of the ammonia from the solid fraction.

Figure 2:
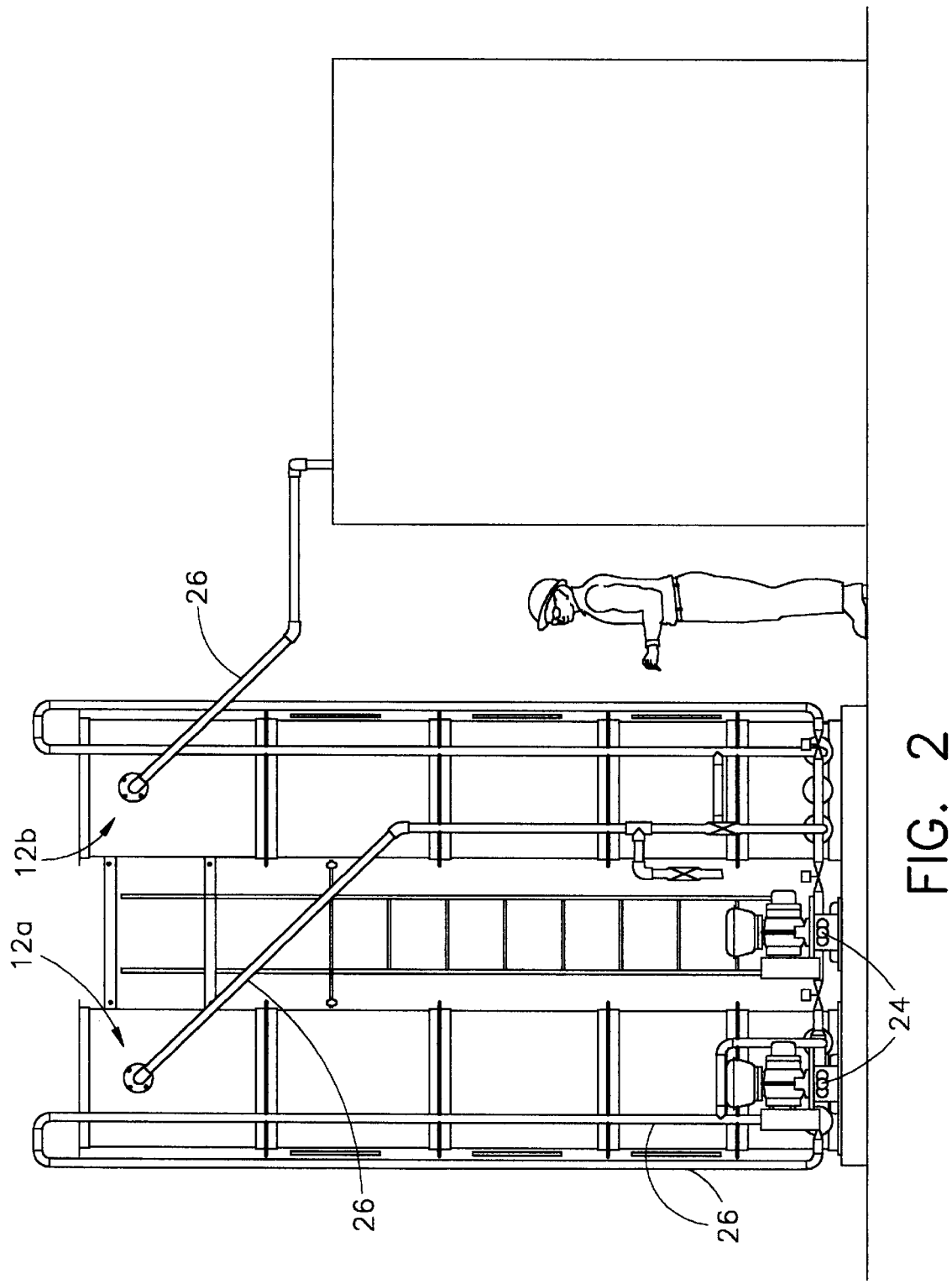
FIGS. 2, 3 and 4 are schematic partial views in plan and cross sections of a preferred embodiment of an aerobic blofilter according to the invention.
Figure 3:
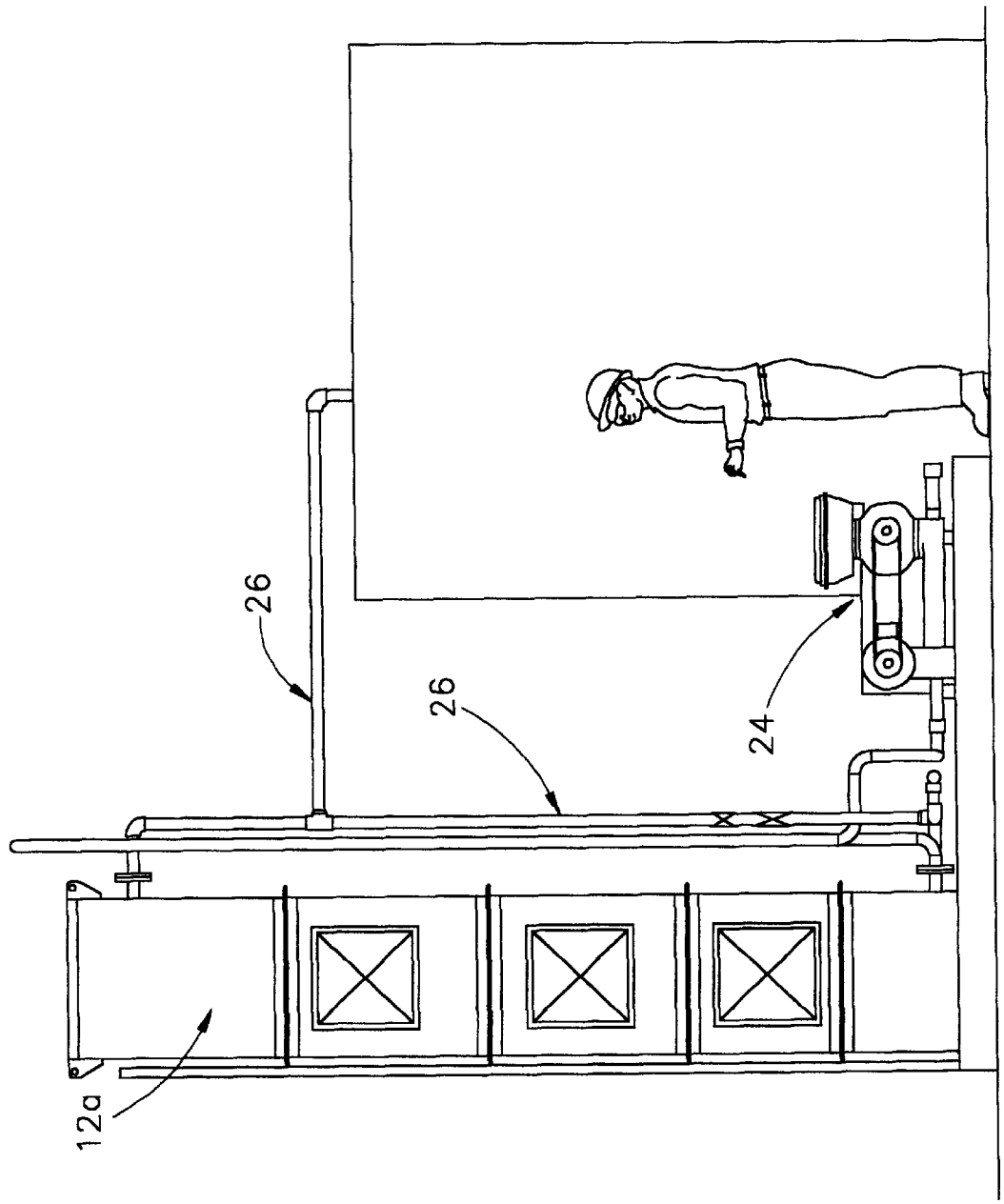
Figure 4:
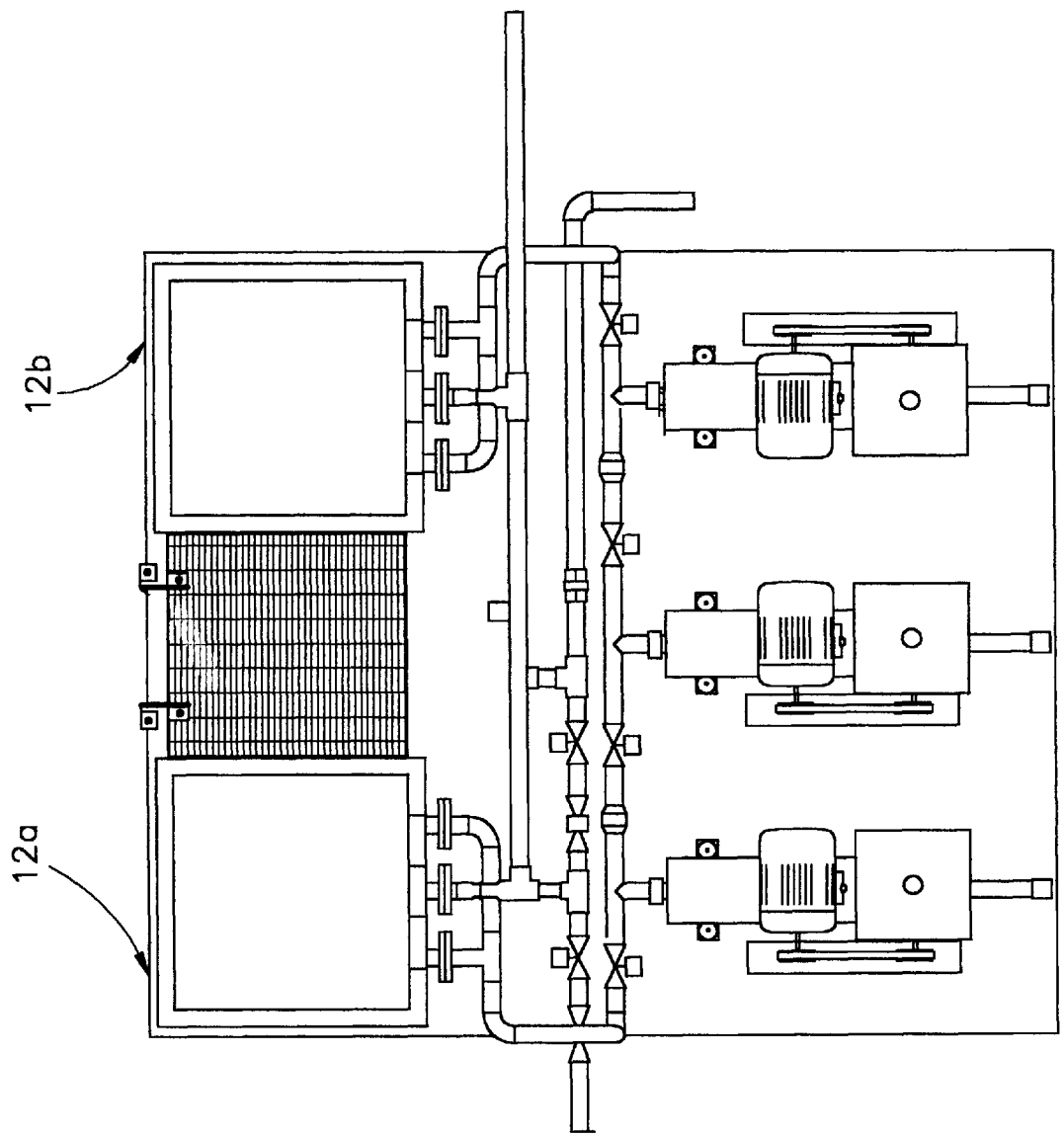

Referring to FIGS. 2 to 4, a preferred embodiment of an aerobic biofilter according to the present invention comprises two bioreactors (12a, 12b) in series and both filled with the porous, i.e. Perforated, tubular plastic media (14) as described hereinbefore. The liquid fraction of the pig manure is first treated in the first bioreactor (12a) and then it is further treated in the second bioreactor (12b). The liquid fraction of the pig manure is fed into the bioreactors by means of conventional pump means (24) and pipe means (26). The second bioreactor promotes nitrification of the ammonia-rich treated waste exiting from the first bioreactor. The treated water from the second bioreactor can be fed either back into the first bioreactor to promote denitrification or to a separate denitrification tank. Ammonia removal by the steps of nitrification/denitrification significantly reduces the odour associated with pig manure.

Advantageously, an aerobic upflow biofilter packed with the porous tubular plastic media can effectively treat the liquid fraction of pig manure at organic loading of 2 to 6 kg $BOD_9$/m$^3$ media/day to levels allowing either reuse as flush water in the farm or direct discharge in the receiving waters.

The plastic net type tubular media does not clog with suspended material and breaks the air bubbles injected at the bottom to very fine bubbles, resulting in very high oxygen transfer efficiencies.

Coating of the solid fraction of the pig manure with powdered zeolite blocks the ammonia-nitrogen, resulting in odourless material. This material, when dried, can be spread on land into which the ammonia will leach gradually.

Tables 1 to 3 show the removal efficiency of a single biofilter and the removal efficiency of two biofilters In series. Tables 1 and 2 further show the added efficiency when two polishing steps are included. Removal of organic matter and nutrients from liquid waste, and nitrification/denitrification, is significant. The tests summarized in Tables 1 to 3 were performed at different times of the year which resulted in a different average temperature in each case.

The aerated biofilters, operated under warm weather conditions (average temperature of 77° F.), can remove about 90% of BOD, 75% of COD and 80% of SS with organic loading up to 6 kg $COD/m^3$-day. $NH_3$—N can be almost completely removed and converted to nitrites and nitrates. Most of the organic matter removal and ammonia oxidation takes place in the first biofilter.

At higher organic loading (over 9 kg $COD/m^3$-day), the biofilters were still capable of removing a significant amount of organic matter and solids (about 70%), but lost some nitrification capacity.

Nitrogen losses have been observed and may be due to simultaneous nitrification/denitrification within the biofilm; full denitrification of nitrate in effluent may be possible by adding a carbon source or mixing with backwash (adds carbon, but also nitrogen, phosphorus, and other nutrients) The biofilters were not efficient In removing phosphorus (only between 15 and 30% removal). Laboratory tests indicated that high total and ortho phosphorus removal (over 95%) from the treated effluent can be obtained through the addition of a chemical coagulant, such as $FeCl_3$.

The dried pelletized solids with zeolite have relatively lower concentrations of both N and P when compared to the composition of the solids separated by the inclined screen and filter press; it has a high K and Na content, due to the composition of zeolite.

Figure 5:
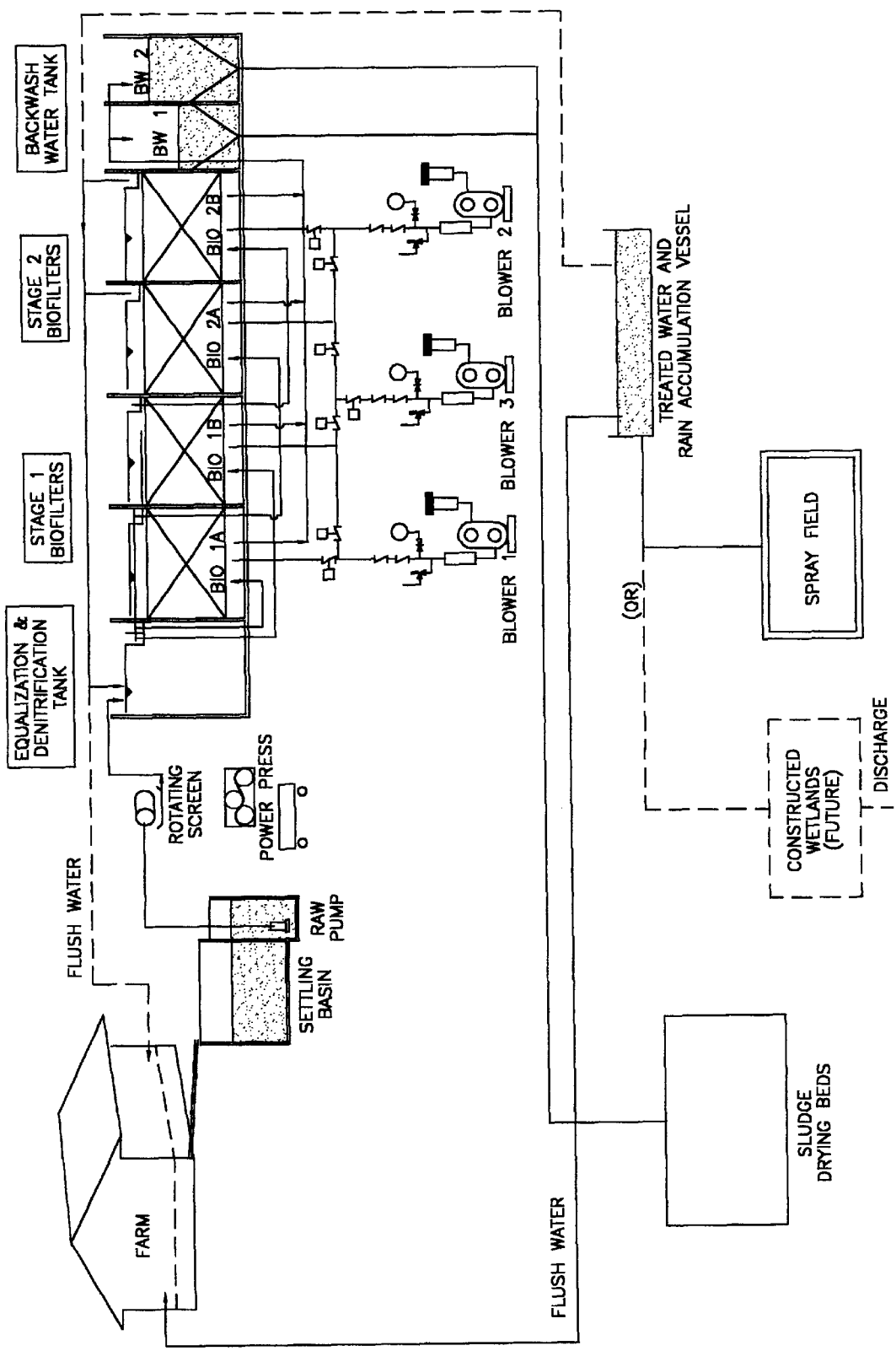
FIG. 5 is a schematic view of blofilters of the invention, illustating preferred use of the bioreactors in series and shown in the context of a farm-based waste treatment system.
Figure 6:
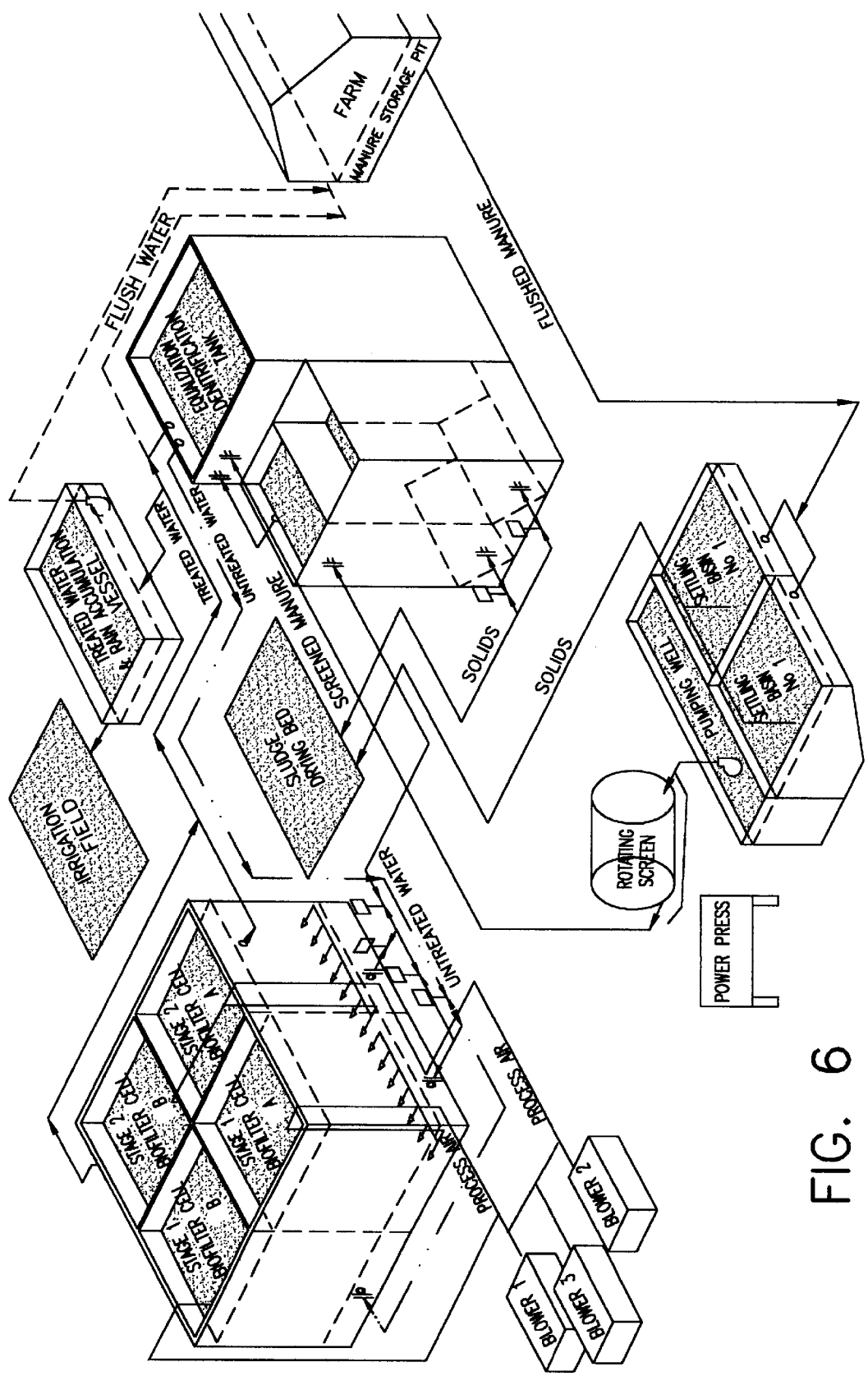
FIG. 6 is a schematic isometric view of biofilters of the invention, preferred use of the bioreactors in series and shown in the context of a farm-based waste treatment system.

FIGS. 5 and 6 show representations of a pig farm waste treatment operation that includes the biofilters of the present invention for the treatment of the liquid fraction of pig manure. As illustrated in FIGS. 5 and 6, preferably respective biofilters (Stage 1 and Stage 2) and respective cells therein (1A and 1B, and 2A and 2B) are connected in series, as a preferred method for efficacious treatment of waste. A rotating screen is preferably provided for separating liquid and solid fractions. A backwash water tank is shown. The biofilters are backwashed periodically, preferably by agitation with increased oxygen-containing gas flow, to remove accumulated suspended solids and newly produced biomass from the system. Biosolids can settle in the backwash tank and an upper liquid portion can be recycled to flush tanks or removed for separate storage.

Although preferred embodiments of the present invention have been described herein and illustrated in the accompanying drawings, it is to be understood that the invention is not limited to these precise embodiments and that various changes and modifications may be effected therein without departing from the scope or spirit of the invention.

TABLE 1

Ekokan Biofilters
Summary of biofilter efficiency in removing organic matter and nutrients (Loading 1–5.7 kg $COD/m^3$.day)
Average temperature: 27.5° C. (June, July and August 1997)
(average values of % reduction and treated effluent concentration)

| Parameter | Influent mg/l | Biofilter 1 % Red. | Biofilter 1 mg/l | Biofilter 2 % Red. | Biofilter 2 mg/l | Overall biofilter % Red. | Polishing 1 % Red. | Polishing 1 mg/l | Polishing 1 % Red. | Polishing 1 mg/l | Overall removal Red. |
|---|---|---|---|---|---|---|---|---|---|---|---|
| COD | 1858 | 60.8 | 728 | 36.5 | 462 | 75.1 | 26.0 | 342 | 5.6 | 323 | 82.8 |
| CODs | 1326 | 66.0 | 451 | 26.6 | 331 | 75.0 | 12.7 | 269 | -2.8 | 297 | 77.6 |
| BOD | 603 | 79.1 | 126 | 42.9 | 72 | 68.1 | 27.B | 52 | 36.5 | 33 | 94.5 |
| BODs | 316 | 92.1 | 25 | 48.0 | 13 | 95.9 | -15.4 | 15 | 13.3 | 13 | 95.9 |
| TS | 2396 | 34.2 | 1577 | 12.6 | 1379 | 42.4 | 32.2 | 935 | -34.1 | 1254 | 47.7 |
| VS | 1311 | 51.6 | 635 | 21.9 | 496 | 62.2 | 45.2 | 272 | -44.1 | 392 | 70.1 |
| SS | 1068 | 63.2 | 393 | 51.7 | 190 | 82.2 | 51.1 | 93 | 4.3 | 89 | 91.7 |
| TKN | 260 | 69.2 | 80 | 40.8 | 41 | 84.2 | -26.8 | 52 | 32.7 | 35 | 86.5 |
| $NH_3$-N | 144 | 82.3 | 25.5 | 67.8 | 8.2 | 94.3 | -46.3 | 12 | 23.3 | 9.2 | 93.6 |
| Total-N | 260 | 55.0 | 117 | 13.7 | 101 | 61.2 | 5.0 | 96 | 1.0 | 95 | 63.5 |
| Total-P | 88 | 25.0 | 66 | 6.8 | 61.5 | 30.1 | 2.4 | 60 | 1.7 | 59 | 33.0 |
| $OPO_4$-P | 56 | 22.4 | 45 | -7.8 | 48.5 | 16.4 | 1.0 | 48 | -4.2 | 50 | 13.8 |

TABLE 2

Summary of biofilter efficiency in removing organic matter and nutrients (Loading 2–9.9 kg $COD/m^3$.day)
Average temperature: 22.5° C. (September 1997)
(average values of % reduction and treated effluent concentration)

| Parameter | Influent mg/l | Biofilter 1 % Red. | Biofilter 1 mg/l | Biofilter 2 % Red. | Biofilter 2 mg/l | Overall biofilter % Red. | Polishing 1 % Red. | Polishing 1 mg/l | Polishing 2 % Red. | Polishing 2 mg/l | Overall removal % Red. |
|---|---|---|---|---|---|---|---|---|---|---|---|
| COD | 1863 | 49.3 | 944 | 35.4 | 610 | 67.3 | 13.6 | 527 | 5.9 | 496 | 73.4 |
| SS | 913 | 37.3 | 572 | 45.8 | 310 | 66.0 | | | | 180 | 80.3 |
| TKN | 306 | 53.6 | 142 | 53.5 | 66 | 78.4 | -7.6 | 71 | 7.0 | 66 | 78.4 |
| $NH_3$-N | 163 | 56.2 | 71.4 | 59.1 | 29.2 | 82.1 | -9.6 | 32 | 3.1 | 31 | 81.0 |
| Total-N | 306 | 47.1 | 162 | 21.0 | 128 | 58.2 | -3.9 | 133 | 5.3 | 126 | 58.8 |
| Total-P | 110 | 15.5 | 93 | 2.2 | 91 | 17.3 | 14.3 | 76 | -15.1 | 90 | 18.2 |
| $OPO_4$-P | 68 | 51.5 | 32 | -46.9 | 47 | 28.8 | 4.3 | 45 | -6.7 | 48 | 27.3 |

TABLE 3

Summary of biofilter efficiency in removing organic matter
and nutrients (Loading 3 - 6.4 kg COD/m³ · day)
Average temperature: 10° C. (Mid October, November,
December 1997, January 1998) (average values of % reduction
and treated effluent concentration

| Parameter | Influent mg/l | Biofilter 1 mg/l | Biofilter 1 % Red. | Biofilter 2 mg/l | Biofilter 2 % Red. | Overall biofilter mg/l | Overall biofilter % Red. |
|---|---|---|---|---|---|---|---|
| COD | 1947 | 47.7 | 1018 | 36.4 | 647 | | 66.8 |
| TS | 2423 | 22.4 | 1881 | 4.5 | 1796 | | 25.9 |
| VS | 1198 | 32.8 | 805 | 13.0 | 700 | | 41.6 |
| SS | 934 | 37.8 | 583 | 51.8 | 281 | | 69.9 |
| TKN | 315 | 24.8 | 237 | 42.2 | 137 | | 56.5 |
| NH$_3$-N | 183 | 26.8 | 134 | 51.5 | 65 | | 64.5 |
| Total-N | 315 | 23.2 | 242 | 18.6 | 197 | | 37.5 |
| Total-P | 85 | 37.6 | 53 | −7.5 | 57 | | 32.9 |
| OPO$_4$-P | 54 | 66.7 | 18 | −33.3 | 24 | | 55.6 |

What is claimed is:

1. A process for treating a slurry of solid and liquid waste, which process comprises:
   a) separating the slurry into a substantially solid waste and a substantially liquid waste;
   b) introducing the liquid waste into the container of an apparatus comprising
      i) a container having a top end and a closed bottom end;
      ii) a first inlet on the container proximal to the closed bottom end for introducing liquid waste;
      iii) a second inlet on the container proximal to the closed bottom end for introducing oxygen-containing gas;
      iv) a first outlet on the container proximal to the top end for removing treated liquid waste;
      v) a second outlet on the container proximal to the closed bottom end for purging solid or semi-solid residue;
      vi) a rigid or semi-rigid perforated media occupying at least part of the container between the top end and the bottom end; and
      vii) means for forcing the liquid waste through the media from the first inlet to the first outlet,
      through the first inlet;
   c) introducing oxygen-containing gas into the container through the second inlet;
   d) forcing the liquid waste through the media whereby the media provides a platform for aerobic microbial degradation of the liquid waste;
   e) recovering treated liquid waste from the first outlet; and
   f) intermittently purging solid or semi-solid residue through the second outlet to prevent clogging of the preforated media.

2. The process according to claim 1, comprising the additional step of adding a zeolite having an affinity for ammonia to the solid waste obtained in step (a), whereby an ammonia component of the solid waste is reduced through transfer to the zeolite.

3. The process according to claim 1, which comprises repeating steps (b) through (f) upon introducing the treated waste of step (e) into the first inlet of an apparatus connected in series, which apparatus permits nitrification to occur.

4. The process according to claim 1, wherein the oxygen-containing gas is air.

5. The process according to claim 1, wherein the slurry is separated using a centrifugal separator.

6. The process according to claim 2, wherein the zeolite is clinoptiolite.

* * * * *